(12) United States Patent
Takakubo

(10) Patent No.: US 7,375,869 B2
(45) Date of Patent: May 20, 2008

(54) TANDEM TYPE SCANNING OPTICAL SYSTEM

(75) Inventor: Yutaka Takakubo, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 25 days.

(21) Appl. No.: 11/298,534

(22) Filed: Dec. 12, 2005

(65) Prior Publication Data
US 2006/0126147 A1 Jun. 15, 2006

(30) Foreign Application Priority Data
Dec. 13, 2004 (JP) ............... 2004-360286

(51) Int. Cl.
G02B 26/08 (2006.01)
(52) U.S. Cl. .................... 359/207
(58) Field of Classification Search ........... 259/205, 259/207
See application file for complete search history.

(56) References Cited
U.S. PATENT DOCUMENTS

| 5,100,226 | A | * | 3/1992 | Freeman ............. 351/160 R |
| 5,486,694 | A | * | 1/1996 | Harris ................. 250/236 |
| 5,838,480 | A | * | 11/1998 | McIntyre et al. ......... 359/205 |
| 6,124,962 | A | | 9/2000 | Kamikubo |
| 6,208,450 | B1 | * | 3/2001 | Toyoda ................ 359/205 |
| 6,259,547 | B1 | | 7/2001 | Kamikubo |
| 6,717,705 | B2 | | 4/2004 | Takakubo |
| 6,751,021 | B2 | * | 6/2004 | Hendriks et al. ......... 359/566 |
| 6,853,470 | B2 | | 2/2005 | Takakubo |
| 6,873,466 | B2 | | 3/2005 | Hama et al. |
| 6,906,824 | B1 | | 6/2005 | Kamikubo et al. |
| 6,954,296 | B2 | | 10/2005 | Takakubo |
| 6,961,163 | B2 | | 11/2005 | Takakubo |
| 2004/0070664 | A1 | * | 4/2004 | Kimura ................. 347/241 |
| 2004/0109213 | A1 | | 6/2004 | Takeuchi et al. |

FOREIGN PATENT DOCUMENTS

| JP | 10-197820 | 7/1998 |
| JP | 2001-142020 | 5/2001 |
| JP | 2003-75751 | 3/2003 |
| JP | 2003-149573 | 5/2003 |

OTHER PUBLICATIONS

English Language Abstract of JP 2003-147573.
English Language Abstract of JP 10-197820.
English Language Abstract of JP 2001-142020.

* cited by examiner

Primary Examiner—Stephone B. Allen
Assistant Examiner—Jennifer L Doak
(74) Attorney, Agent, or Firm—Greenblum & Bernstein, P.L.C.

(57) ABSTRACT

A scanning optical system is provided with a light source configured to emit a plurality of beams, a deflecting device configured to deflect the plurality of beams simultaneously to scan in a main scanning direction, and an imaging optical system configured to converge the plurality of beams on a plurality of target surfaces to form a plurality of beam spots scanning on the plurality of target surfaces, respectively.

9 Claims, 12 Drawing Sheets

F1 : STRESS DUE TO CONTRACTION
F2 : STRESS DUE TO BENDING
F  : RESULTANT FORCE OF F1 AND F2
F3 : COMPONENT OF F IN A DIRECTION OF NORMAL TO STEPPED SURFACE
F4 : COMPONENT OF F IN A DIRECTION OF TANGENT TO STEPPED SURFACE

F1' : STRESS DUE TO CONTRACTION
F2' : STRESS DUE TO BENDING
F'  : RESULTANT FORCE OF F1 AND F2
F3' : COMPONENT OF F IN A DIRECTION
      OF NORMAL TO STEPPED SURFACE
F4' : COMPONENT OF F IN A DIRECTION
      OF TANGENT TO STEPPED SURFACE

F1 : STRESS DUE TO CONTRACTION
F2 : STRESS DUE TO BENDING
F  : RESULTANT FORCE OF F1 AND F2
F3 : COMPONENT OF F IN A DIRECTION
     OF NORMAL TO STEPPED SURFACE
F4 : COMPONENT OF F IN A DIRECTION
     OF TANGENT TO STEPPED SURFACE

TANDEM TYPE SCANNING OPTICAL SYSTEM

BACKGROUND OF THE INVENTION

The present invention relates to a tandem type scanning optical system for an image formation device such as a color laser printer.

Tandem type scanning optical systems are typically employed in color image formation devices employing an electrophotographic imaging method. The tandem type scanning optical system is generally configured such that a plurality of beams emitted from a plurality of laser diodes are deflected by a single polygonal mirror to dynamically scan in a predetermined direction (which will be referred to as a main scanning direction), and the deflected beams are incident on a plurality of photoconductive drums for forming images of primary color components or complementary color components, respectively, via imaging optical systems (i.e., fθ lens). As exposed to scanning beams, latent images for the primary or complementary color components are formed on the photoconductive drums, respectively.

Examples of such a scanning optical system are disclosed in Japanese Patent Provisional Publications P2003-075751A (hereinafter, referred to as '751 publication) and P2003-149573A (hereinafter, referred to as '573 publication). According to these publications, the imaging optical system includes a first lens group arranged to receive all of the plurality of deflected beams, and a plurality of second lens groups that respectively receive the plurality of deflected beams. According to '751 publication and '573 publication, chromatic aberration of the second lens is not compensated for. Therefore, if the wavelengths of the plurality of laser beams emitted by the plurality of laser diodes are different, the chromatic aberration occurs. In such a case, due to the chromatic aberration, the length of the scanned lines (i.e., magnifications) of respective color components formed on the photoconductive drums may be different from each other.

Incidentally, a diffractive lens structure has been known as measures to compensate for the chromatic aberration due to the difference among wavelengths of the plurality of beams. Examples of such an application of the diffractive lens are disclosed in Japanese Patent Provisional Publications No. HEI 10-197820A (hereinafter, referred to as '820 publication) and P2001-142020A (hereinafter, referred to as '020 publication).

It should be noted, however, it is relatively difficult to form the diffractive lens structure in the scanning optical system disclosed in '751 publication and '573 publication.

When the imaging optical system consists of only the first and second optical systems, it is preferable to employ the diffractive lens structure on a surface of the first lens group since the first group of optical system is relatively small in size along the main scanning direction. On the other hand, since the diffractive lens structure, or the lens having the diffractive lens structure on a surface thereof is typically made of resin material and formed by injection molding, and it is necessary to form a molding die, it is preferable that the diffractive lens structure can be formed on a master block using a lathe. The diffractive lens structure for compensating for the lateral chromatic aberration has a pattern of steps repeated along the main scanning direction. That is, a boundary of adjoining diffraction areas extends in an auxiliary scanning direction (which is perpendicular to the main scanning direction). Therefore, a base curve on which the diffractive lens structure is formed is typically rotationally symmetrical about the optical axis or rotationally symmetrical about an axis extending in the main scanning direction (i.e., the base curve is arc-shaped cross section when cut along the auxiliary scanning direction).

If the rotationally symmetrical surface about the optical axis is formed in the first lens group, part of the beams incident on the first lens group after reflected by the polygonal mirror may be reflected by the surface rotationally symmetrical about the optical axis, reflected by an adjoining reflection surface of the polygonal mirror, incident on surfaces to be scanned via the imaging optical system as ghost light, and cause uneven density thickness.

Further, if the diffractive lens structure is formed on a lens surface, it is necessary to avoid deterioration of the diffractive lens structure due to contraction after molding. The diffractive lens structure for compensating for the longitudinal chromatic aberration has steps, whose side surfaces are parallel with the optical axis of the lens as well as the auxiliary scanning direction.

According to the optical system disclosed in '751 publication, the following problem arises. Only the surface of the lens whose shape in the auxiliary scanning direction is arc-shaped and thus, the mother die for which can be formed with the lathe is the target surface side surface of the elongated lens of the second lens group. However, it will take a relatively long period of time to form the mother die of the diffractive lens structure to be formed on this lens, which is elongated in the main scanning direction. Therefore, this elongated lens is not appropriate for such a purpose. It should be noted that, according to the '751 publication, the second lens of the first group is a glass lens, therefore, it is not appropriate for the lens on which the diffractive lens structure is formed.

According to the third embodiment of '573 publication, a polygonal mirror side surface of the scanning lens is a spherical surface, which is advantageous in forming the mother die thereof. However, since this surface is a concave surface, the shape of the diffractive lens may be broken due to contraction after molding. Therefore, this surface is inappropriate for the diffractive lens structure. The other embodiments of the '573 publication each consists of three groups of lenses, which may increase the manufacturing cost.

SUMMARY OF THE INVENTION

The present invention is advantageous in that an improved scanning optical system consisting of two imaging lens groups is provided. The scanning optical system is configured such that the mother die of the lens surface on which the diffractive lens structure is formed can be made with the lathe, and the diffractive lens structure of the lens surface will hardly be broken by the contraction thereof after molding. Further, the image lens can suppress the ghosting light.

According to an aspect of the invention, there is provided a scanning optical system, which is provided with a light source configured to emit a plurality of beams, a deflecting device configured to deflect the plurality of beams simultaneously to scan in a main scanning direction, and an imaging optical system configured to converge the plurality of beams on a plurality of target surfaces to form a plurality of beam spots scanning on the plurality of target surfaces, respectively.

The imaging optical system may include a first lens having a single lens element arranged on a common optical path along which the plurality of beams deflected by the deflecting device proceed, and a diffractive lens structure formed on a target surface side surface of the first lens. A base curve of the lens surface on which the diffractive lens structure may be formed has a rotational symmetry axis extending in the main scanning direction, the curvature of the lens surface taken along the main scanning directions and the curvature taken along an auxiliary scanning direction are different from each other.

The diffractive lens structure may be configured to compensate for longitudinal chromatic aberration of the scanning optical system due to the difference of wavelengths of the plurality of beams.

Further, the base curve on which the diffractive lens structure is formed may be a toric surface, of which a shape along the main scanning direction is convex on a deflection device side. Alternatively, the base curve on which the diffractive lens structure is formed may be a toric aspherical surface of which a shape along the auxiliary scanning direction is a non-arc shape.

A deflection device side lens surface of the first lens may be an aspherical surface of which a shape in the main scanning direction is defined as a function of a distance in the main scanning direction from the optical axis of the first lens, and a curvature in the auxiliary scanning direction is defined as another function of a distance in the main scanning direction from the optical axis.

The imaging optical system may include a plurality of second lenses respectively arranged on a plurality of optical paths of the plurality of beams, each of the plurality of second lenses having a single lens element.

The first lens may be arranged at a position closer to the deflecting device than any other optical elements included in the imaging optical system.

The deflecting device may be a polygonal mirror.

According to another aspect of the invention, there is provided a tandem type imaging apparatus which employs the scanning optical system as described above.

According to a further aspect of the invention, there is provided a lens to be used as a first lens of an imaging optical system of a scanning optical system as described above.

BRIEF DESCRIPTION OF THE ACCOMPANYING DRAWINGS

DETAILED DESCRIPTION OF THE EMBODIMENTS

Hereinafter, referring to the accompanying drawings, scanning optical systems according to embodiments of the invention will be described.

Figure 1:
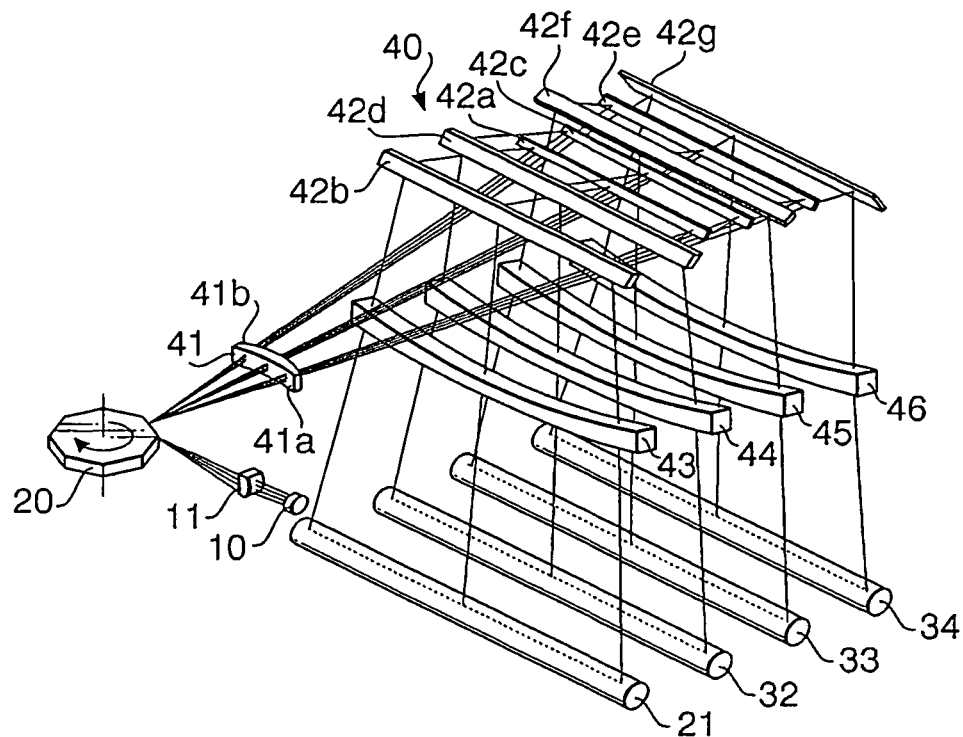
FIG. 1 is a perspective view of a tandem type scanning optical system according to an embodiment of the invention.
Figure 2:
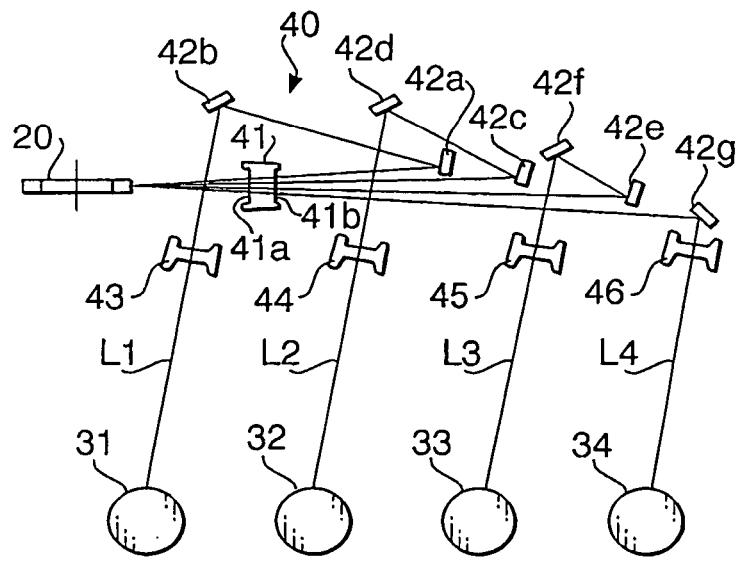
FIG. 2 is a cross sectional view of the scanning optical system taken along an auxiliary scanning direction.

FIG. 1 is a perspective view of a tandem type scanning optical system according to a first embodiment of the invention, and FIG. 2 is a cross sectional view of the scanning optical system taken along an auxiliary scanning direction. It should be noted that the scanning optical systems according to first through third embodiments described hereinafter have similar appearance, and the schematic configuration of the scanning optical system according to the first embodiment shown in FIGS. 1 and 2 also applies to the second and third embodiment.

The scanning optical system shown in FIGS. 1 and 2 is employed, for example, in a tandem type laser scanning unit for a color laser printer. A plurality of laser beam respectively ON/OFF modulated in accordance with image signals corresponding to a plurality of color components. The plurality of beams are scanned on a plurality of photoconductive drums corresponding to the plurality of color components, thereby forming electrostatic latent images thereon. In the specification, a direction in which each beam spot scans on the photoconductive drum is referred to as a main scanning direction. A direction in which a line tangent to the photoconductive drum at a position where the beam is incident on the photoconductive drum and perpendicular to the main scanning direction is referred to as an auxiliary scanning direction. In the following description, shape of each optical element, directions of powers of the lenses will be described with reference to the directions on the scan target surface.

The tandem type scanning optical system shown in FIGS. 1 and 2 includes a light source unit 10 that emits for beams L1-L4 (see FIG. 2), a polygonal mirror 20 that reflects/deflects the four beams emitted by the light source unit 10 to scan, and an imaging optical system 40 that converges the four beams deflected by the polygonal mirror on four photoconductive drums 31-32 (which are target surfaces), respectively.

The light source unit 10 includes four laser diodes and four collimating lenses provided for the four laser diodes, respectively, and emits the four beams, each of which is a substantially parallel light beam. Between the light source unit 10 and the polygonal mirror 20, a cylindrical lens 11 having a power only in the auxiliary scanning direction is provided. The four beams are converged only in the auxiliary scanning direction and form a linear image on a plane in the vicinity of the reflection surface of the polygonal mirror 20.

It should be noted that incident angles of the four beams on a cross section along the auxiliary scanning direction are different and cross on the reflection surface of the polygonal mirror 20. With this configuration, it is possible to suppress the height (in the auxiliary scanning direction) of the polygonal mirror 20. The incident angles in the auxiliary scanning direction of the inner two beams L2 and L3 are ±αin, those of the outer beams L1 and L4 are ±βout.

The imaging optical system 40 includes a first lens 41 that is arranged on a common optical path of the plurality of beams reflected by the polygonal mirror 20, and first through seventh mirrors 42a-42g that are arranged to reflect each of the beams that are emerged from the first lens 41 and proceeds in directions forming certain angles in the auxiliary scanning direction downward in the figures, and second lenses 43-46, each of which is arranged on the target surface side with respect to the mirror (i.e., one or two of the mirrors 42a-42g) to allow each beam to pass therethrough.

The four beams L1-L4 simultaneously deflected as the polygonal mirror 20 rotates proceed at different angular directions in the auxiliary scanning direction and enter the first lens 41. As shown in FIG. 2, the beam L1 emerged from the first lens L1 is reflected by a pair of mirrors 42a and 42b, and is converted on the photoconductive drum 31 via the second lens 43 to form a scanning beam spot on the surface of the photoconductive drum 31. Similarly, the beam L2 is reflected by the mirrors 42c and 42d, passes through the second lens 44, is converged on the photoconductive drum 32. The beam L3 is reflected by the mirrors 42e and 42f, converged on the photoconductive drum 33 via the second lens 45. The beam L4 is reflected by the mirror 42g, and converged on the photoconductive drum 34 via the second lens 46. As the polygonal mirror 20 rotates, the four beam spots respectively formed on the photoconductive drums 31-34 form scan lines thereon simultaneously.

The polygon mirror side lens surface 41a of the first lens 41 is an anamorphic aspherical surface, which is defined such that the shape in the main scanning direction is a function of a distance, with respect to the optical axis, in the main scanning direction, and the curvature of the surface in the auxiliary scanning direction is defined as a function of the distance, with respect to the optical axis, in the main scanning direction. Thus, the shape in the main scanning direction and the curvature in the auxiliary scanning direction are defined independently.

Figure 3:
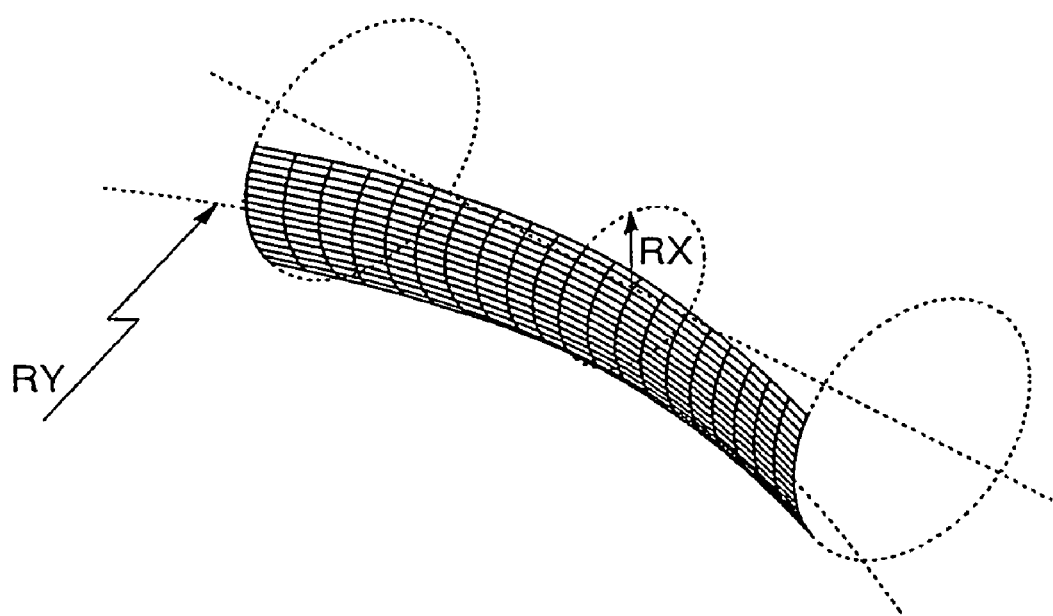
FIG. 3 illustrates a shape of a toric lens surface.
Figure 4:
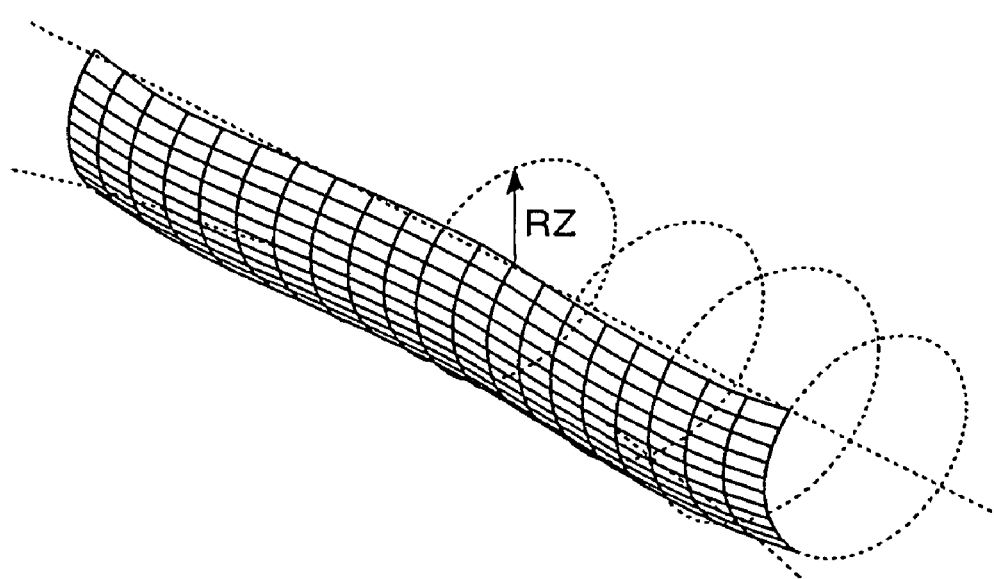
FIG. 4 illustrates a shape of a toric aspherical surface.

The photoconductive drum side surface 41b is a surface on which the diffractive lens structure for compensating for the longitudinal chromatic aberration is formed. The base curve of the surface 41b is a surface of which the cross section along the main scanning direction is convex and the cross section along the auxiliary scanning direction is concave. Two illustrative examples of the surface 41b are shown in FIGS. 3 and 4. FIG. 3 shows a toric surface of which the radius RY of curvature in the main scanning direction and the radius RZ of curvature in the auxiliary scanning direction are different. FIG. 4 shows a toric aspherical surface of which the shape along the main scanning direction is aspherical.

By forming the diffractive lens structure on the surface 41b of which the base curve has a convex shape in the main scanning direction, the deterioration of the shape of the diffractive lens structure due to the contraction after molding can be avoided.

Figures 5A, 5B:
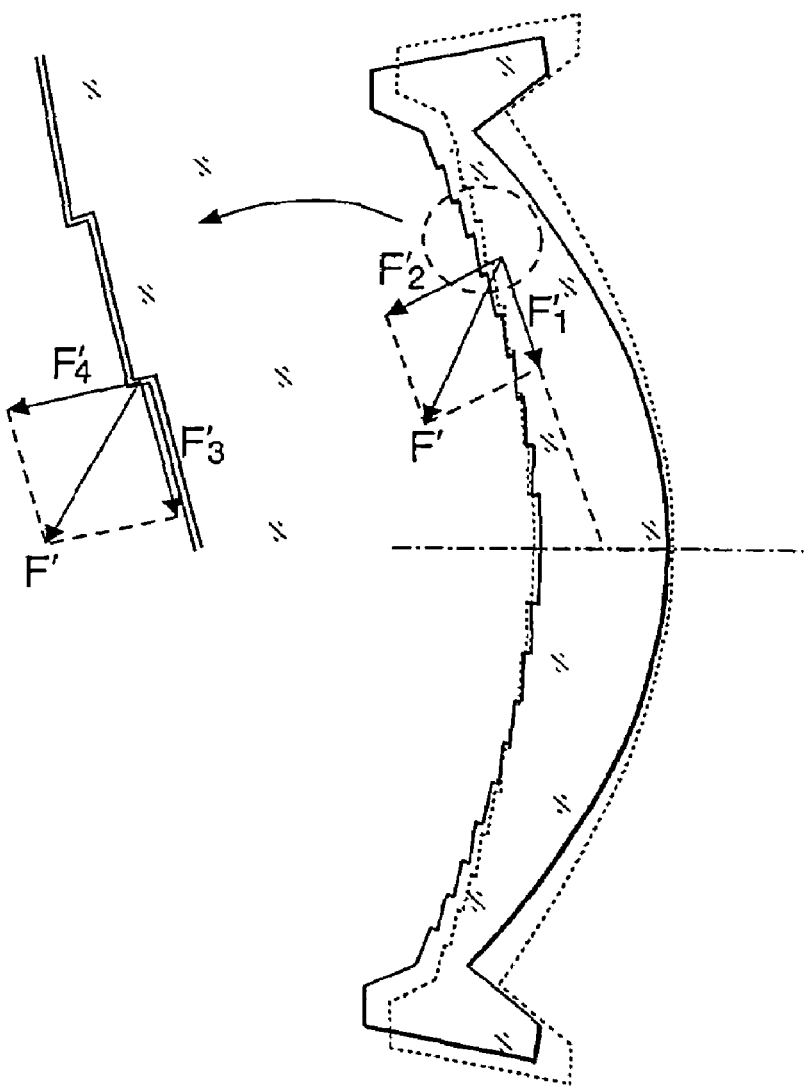
FIG. 5A illustrates a stress which is generated after a diffractive lens structure is formed on a concave surface of a lens after the lens is molded.
FIG. 5B is a partially enlarged view thereof.

This effect will be described in comparison with a case where the diffractive lens structure would be formed on the surface 41a of which the shape in the main scanning direction is concave. FIG. 5A shows a case where the diffractive lens structure is formed on the surface 41a. FIG. 5B is a partially enlarged view of a portion of FIG. 5A indicated by a circle of broken lines.

After the first lens 41 is made by molding, when the first lens 41 is cooled and solidified, stress F1' caused by contraction about the center of the lens due to temperature change (cooled down) of the lens material (plastic), and stress F2' caused by the tendency of the concave surface of the meniscus shape to bend in the concave surface side direction, the shape of the first lens 41 indicated by solid line changes to a shape indicated by broken lines. If the stress F', which is a resultant of the forces of F1' and F2', is divided into a component F3', which is in perpendicular to the stepped wall portion of the diffractive lens structure and F4' which is parallel to the wall portion of the diffractive lens structure. Both the components F3' and F4' work as the force that deteriorates the steps of the diffractive lens structure by urging the steps of the diffractive lens structure to the steps of the mother die.

Figures 6A, 6B:
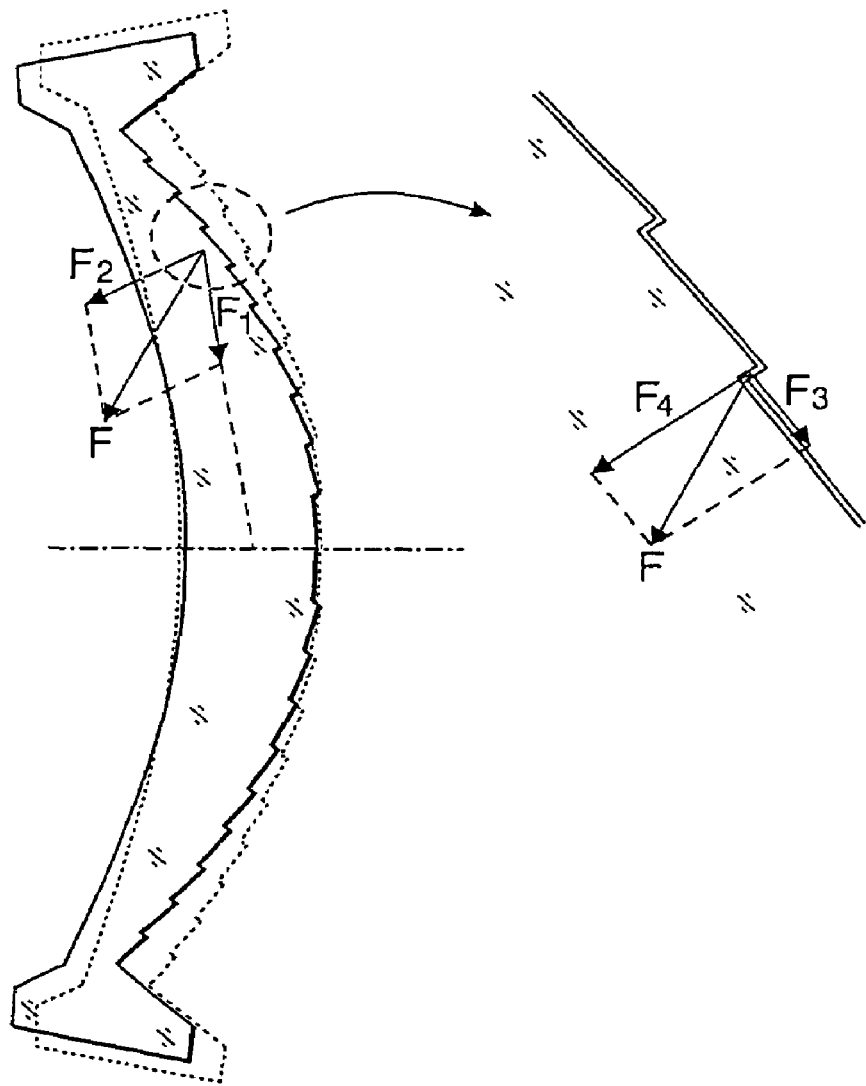
FIG. 6A illustrates a stress which is generated after a diffractive lens structure is formed on a convex surface of a lens after the lens is molded.
FIG. 6B is a partially enlarged view thereof.

If the diffractive lens structure is formed on the target surface side lens surface 41b, stresses work differently. That is, as shown in FIGS. 6A and 6B, a resultant force F of the stress F1 due to the contraction and the stress F2 due to bending is divided into a component F3 perpendicular to the stepped walls of the diffractive lens structure and a component F4 parallel to the steeped walls of the diffractive lens structure, the component F3 works in a direction where the steps of the diffraction lens structure are urged toward the steps of the mother die, while the component F4 works in a direction where the lens is moved away from the mother die. Therefore, the resultant F of the stresses F1 and F2 will not work to break the steps of the diffraction lens structure. Therefore, the possibility that the steps of the diffractive lens structure are broken is lower when the diffractive lens structure is formed on the convex surface (i.e., surface 41b) than on the concave surface (i.e., surface 41a).

It should be noted that, in FIGS. 5A, 5B, 6A and 6B, the degree of deformation of the lens is exaggerated for illustrative purpose. The size of the diffractive lens structure and the number of the steps of the diffractive lens structure are also shown in the exaggerated manner for illustrative purpose.

Further, the base curve of the lens surface 41b has a rotationally symmetrical about an axis extending in the main scanning direction. Therefore, the mother die thereof can be formed using the lathe. Further, the base curve is a surface of which the cross sections in the main scanning direction and the auxiliary scanning direction have different radii of curvatures. Therefore, the light reflected on this surface will not be incident on the polygonal mirror, which prevents the ghosting light by the reflection of the polygonal mirror side lens surface.

Each of the first lens side surfaces of the second lenses 43-46 is a two-dimensional polynomial aspherical surface, which is defined such that a sag amount (i.e., a distance between a point on the surface and a reference plane which is a tangential plane contacting the surface at the center thereof) is expressed as a two-dimensional polynomial with respect to the coordinate of the point in the main scanning direction and the auxiliary scanning direction. Further, each of the first lens side surfaces of the second lenses 43-46 is symmetrical with respect to a line extending in the auxiliary scanning direction and passing the center of the surface.

The second lenses 43-46 are lenses of the same design, but the second lens 43 in which the outer beam L1 is incident and the second lens 44 in which the inner beam L2 is incident have different decentering amounts DEC-Z with respect to the optical axis in the auxiliary scanning direction, and angles TILT-β in the auxiliary scanning direction with respect to the optical axis. It should be noted that the second lenses 45 and 46 are symmetrical with the second lenses 44 and 43 about the optical axis (which is the optical axis of the imaging optical system 40 when the reflection surfaces are developed).

Next, three concrete design examples according to the above configuration and a comparative example which is not formed with the diffractive lens structure will be described.

FIRST EXAMPLE

Figure 7:
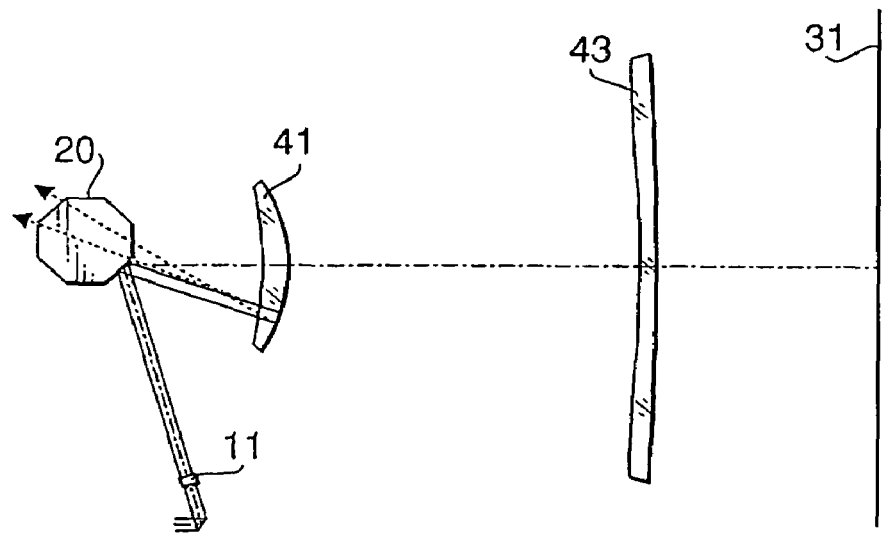
FIG. 7 shows an arrangement of optical elements of the scanning optical system on a main scanning plane according to a first embodiment.

FIG. 7 shows a configuration of the scanning optical system according to a first example. In FIG. 7, the mirrors of the scanning optical system are omitted and the optical paths are developed. Further, the configuration only for the beam L1 is shown for the brevity, and thus, only the second lens 43 and the photoconductive drum 31 are shown in FIG. 7. It should be appreciated that for the other beams L2-L4, the configurations are substantially the same as that shown in FIG. 7. Arrows indicated by broken lines in FIG. 7 represent beams reflected by the photoconductive drum side surface of the first lens 41. As will be described in detail, the beams indicated by broken lines proceed at different levels in the auxiliary scanning direction with respect to the polygonal mirror 20. Therefore, these beams does not serve as ghosting light.

Table 1 indicates a numerical structure on the photoconductive drum side with respect to the cylindrical lens 11 of the scanning optical system according to the first example. In Table 1, Ry represents a radius of curvature in the main scanning direction (unit: mm), Rz represents a radius of curvature in the auxiliary scanning direction (unit: mm), D represents a distance between surfaces on the optical axis (unit: mm), N represents a refractive index at the design wavelength of 780 nm, DEC-Z represents the decentering amount (unit: mm) in the auxiliary scanning direction with respect the optical axis of the scanning lens 30 when the optical paths are developed and the mirrors are omitted, TILT-β represents an inclination (unit: degree) in the auxiliary scanning direction with respect to the optical axis of the scanning lens 30 when the optical paths are developed and the mirrors are omitted. The incident angle with respect to the polygonal mirror 20 represents an angle formed by the central axis of each beam with respect to a normal to the reflection surface when the beam is incident on the polygonal mirror 20 (the angle in the auxiliary scanning direction represents an angle projected onto a plane perpendicular to the main scanning direction).

TABLE 1 focal length: 235 mm
scanning width: 216 mm
design wavelength: 780 nm (765 nm-795 nm)
polygon incident angle
main scanning direction: −75.0°
auxiliary scanning direction: outer beam 3.6°, inner beam 1.2°

| surface | Ry | Rz | D | N(780 nm) | DEC-Z | TILT-β |
|---|---|---|---|---|---|---|
| #1 | ∞ | −51.080 | 4.000 | 1.51072 | 0.000 | 0.000 |
| #2 | ∞ | | 97.000 | 1.00000 | 0.000 | 0.000 |
| #3 | ∞ | | 54.000 | 1.00000 | 0.000 | 0.000 |
| #4 | −206.324 | −60.343 | 10.000 | 1.48617 | 0.000 | 0.000 |
| #5 | −73.401 | 80.000 | 140.000 | 1.00000 | 0.000 | 0.000 |
| #6 | −533.829 | | 6.000 | 1.48617 | 12.000/5.747 | 0.900/−0.114 |
| #7 | −1800.000 | | 86.500 | 1.00000 | 0.000 | 0.000 |
| #8 | ∞ | | 0.000 | 1.00000 | 2.045/−0.870 | 0.000 |

*values of DEC-Z and TILT-β are those for outer/inner beams

In Table 1, surface numbers 1 and 2 represent the cylindrical lens 11, surface number 3 represents a reflection surface of the polygonal mirror 20, surface numbers 4 and 5 represent the first lens 41, surface numbers 6 and 7 represent the second lens 43, surface number 8 represents the photoconductive drum 31.

The first surface is a cylindrical surface, the second and third surfaces are planar surfaces, the fourth surface is the anamorphic aspherical surface, the fifth surface is the toric surface on which the diffractive lens structure is formed, the sixth surface is the two-dimensional polynomial aspherical surface and the seventh surface is the spherical surface. The power of the polygonal mirror side surface of the first lens 41 in the auxiliary scanning direction is 2.309 dptr.

The anamorphic aspherical surface is expressed by the following equation.

$$X(y) = \frac{Cy^2}{1+\sqrt{1-(1+x)C^2y^2}} + \sum_{n=1} AM_n y^n$$

$$C_z(y) = C_{z0} + \sum_{n=1} AS_n y^n$$

where, X(y) represents a sag amount (i.e., a distance between a point on the surface and the tangential plane) at a position where the distance from the optical axis in the main scanning direction is y, Cz(y) represents a curvature of an arc in the auxiliary scanning direction contacting the surface at the point. Further, C represents a curvature in the main scanning direction, x represents a conical coefficient, Amn represents a n-th degree aspherical coefficient defining the curvature in the main scanning direction, Czo represents a curvature in the auxiliary scanning direction on the optical axis (i.e., Czo=1/rz), ASn represents n-th degree aspherical coefficient defining the curvature in the auxiliary scanning direction.

Values of the coefficients defining the fourth surface are indicated in Table 2. It should be noted that, in Table 2, "E" represents ten's power (exponential) and, for example, "−1.2397E−07" represents "−1.2397×10⁻⁷".

TABLE 2

Fourth surface (anamorphic aspherical surface)

| K | | | 0.000E+00 |
|---|---|---|---|
| $AM_1$ | 0.000E+00 | $AS_1$ | −9.7010E−06 |
| $AM_2$ | 0.000E+00 | $AS_2$ | −5.3823E−06 |
| $AM_3$ | 0.000E+00 | $AS_3$ | 1.3872E−08 |
| $AM_4$ | −1.2397E−07 | $AS_4$ | −5.8420E−10 |
| $AM_5$ | 0.000E+00 | $AS_5$ | −4.3189E−11 |
| $AM_6$ | 7.4646E−12 | $AS_6$ | 1.4343E−12 |
| $AM_7$ | 0.000E+00 | $AS_7$ | 3.3431E−14 |
| $AM_8$ | 5.1455E−15 | $AS_8$ | −2.0377E−16 |

The diffractive lens structure has annular structures coaxial about the optical axis Ax1. Since the first lens 41 is an elongated lens, the annular structures appear substantially rectangular structures, and functions to compensate for the longitudinal chromatic aberration. The diffractive lens structure is expressed by an additional optical path length Δθ at a height h from the optical axis Ax1.

$$\Delta\theta(h) = P_2 h^2 + P_4 h^4 + P_6 h^6 + P_8 h^8 + P_{10} h^{10}$$

where, Pn represents n-th degree (n is even number) optical path length difference coefficient. Table 3 shows the optical path length difference coefficients defining the diffractive lens structure formed on the fifth surface.

TABLE 3

Fifth surface (diffractive lens)

| $P_2$ | −8.5013E−02 |
|---|---|
| $P_4$ | −5.1487E−06 |
| $P_6$ | 0.0000E+00 |
| $P_8$ | 0.0000E+00 |
| $P_{10}$ | 0.0000E+00 |

The two-dimensional polynomial aspherical surface is expressed by the two-dimensional polynomial indicated below.

$$X(y, z) = \frac{Ch^2}{1 + \sqrt{1-(1+x)C^2 h^2}} + \sum_{n=0}\sum_{m=0} B_{mn} y^m z^n$$

where, y represents a distance, in the main scanning direction, on a plane that is tangent to the surface at the center thereof, z represents a distance in the auxiliary scanning direction, X(y, z) represents a sag amount, C represents the curvature (i.e., 1/ry) in the main scanning direction at the center of the surface, x represents a conical coefficient, h represents a distance from the center of the surface (i.e., $(y^2+z^2)^{1/2}$), and Bmn represents coefficient (m: degree in the main scanning direction; and n: degree in the auxiliary scanning direction).

It should be noted that the above equation is generally known as a formula expressing a rotationally asymmetrical curved optical surface. If Bmn is defined to have a value other than zero when n is an odd number, the shape of the surface is asymmetrical with respect to a plane that is perpendicular to the auxiliary scanning direction and includes the center of the surface. Table 4 indicates values of coefficients defining the sixth surface.

TABLE 4

Sixth surface (two-dimensional polynomial aspherical surface)

| | $B_{Z0}$ | $B_{Z1}$ | $B_{Z2}$ | $B_{Z3}$ | $B_{Z4}$ |
|---|---|---|---|---|---|
| $B_{Y0}$ | — | 7.7126E−02 | 1.6905E−02 | −3.0412E−05 | −2.2431E−06 |
| $B_{Y1}$ | 0.0000E+00 | 0.0000E+00 | 0.0000E+00 | 0.0000E+00 | 0.0000E+00 |
| $B_{Y2}$ | 0.0000E+00 | −6.4382E−07 | −2.2100E−07 | 6.4873E−10 | −3.7334E−10 |
| $B_{Y3}$ | 0.0000E+00 | 0.0000E+00 | 0.0000E+00 | 0.0000E+00 | 0.0000E+00 |
| $B_{Y4}$ | 6.1981E−08 | −6.1505E−11 | 6.0489E−12 | 3.3020E−13 | −4.7274E−14 |
| $B_{Y5}$ | 0.0000E+00 | 0.0000E+00 | 0.0000E+00 | 0.0000E+00 | 0.0000E+00 |
| $B_{Y6}$ | −2.3883E−13 | −6.0375E−15 | −4.4384E−15 | −5.0047E−17 | 0.0000E+00 |
| $B_{Y7}$ | 0.0000E+00 | 0.0000E+00 | 0.0000E+00 | 0.0000E+00 | 0.0000E+00 |
| $B_{Y8}$ | −6.9570E−17 | 1.0064E−18 | 4.7717E−19 | 0.0000E+00 | 0.0000E+00 |

Figure 8A:
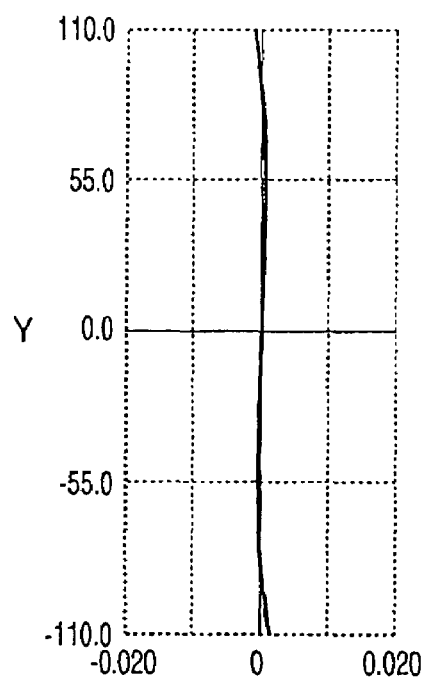
FIG. 8A shows longitudinal chromatic aberration according to the first embodiment when a wavelength of a laser beam is 15 nm lower than the reference wavelength of 780 nm.
Figure 8B:
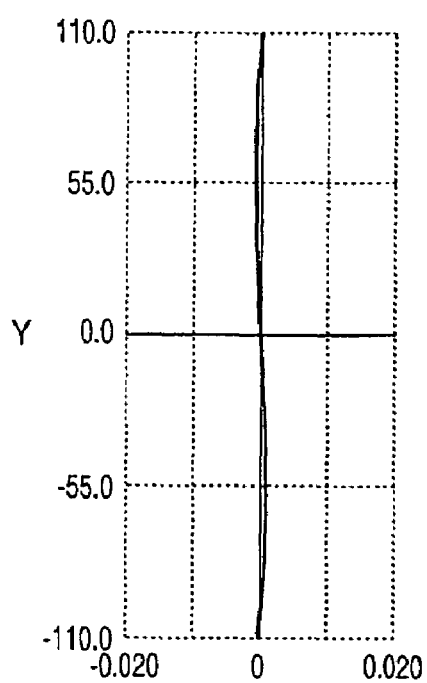
FIG. 8B shows longitudinal chromatic aberration according to the first embodiment when the wavelength of the laser beam is 15 nm is higher than the reference wavelength of 780 nm.

FIGS. 8A and 8B show longitudinal chromatic aberration of the scanning optical system according to the first example. Specifically, FIG. 8A shows a characteristic when the wavelength of the laser beam is 15 nm lower than the design wavelength of 780 nm. FIG. 8B shows the characteristic when the wavelength is 15 nm higher than the design wavelength of 780 nm. In both graphs, the vertical axis represents a scanning position (unit: mm) in the main scanning direction, and the horizontal axis represents the amount of aberration (unit: mm). It is understood from both graphs, regardless whether the wavelength is shifted upward or downward, the longitudinal chromatic aberration can be well suppressed according to the configuration of the first example.

Figure 9A:
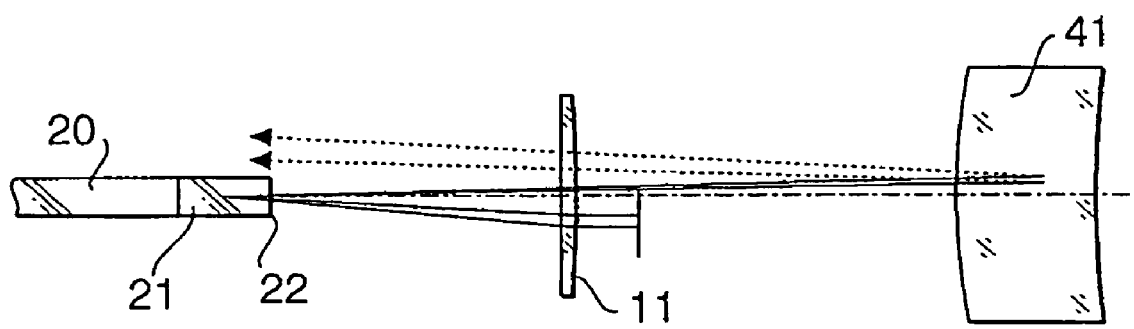
FIGS. 9A and 9B show optical paths of the laser beams reflected by the first lens of the scanning optical system according to the first embodiment.
Figure 9B:
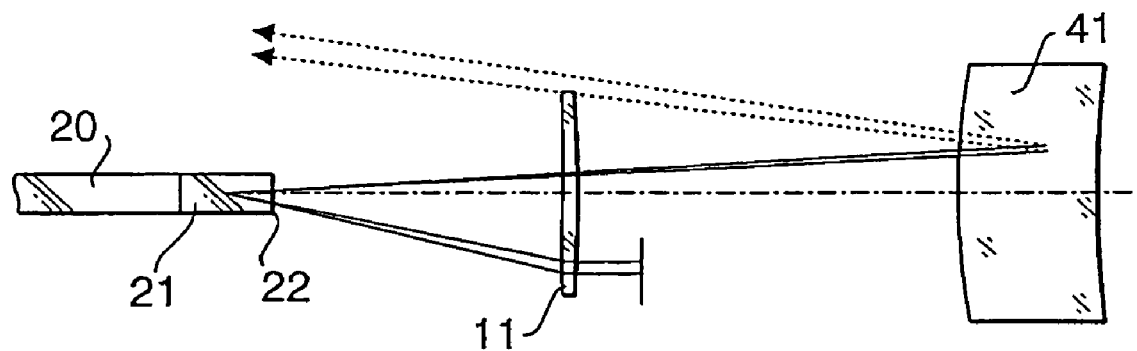

FIGS. 9A and 9B show enlarged cross sectional views, viewed along the main scanning direction, of a part of the polygonal mirror 20, the cylindrical lens 11 and the first lens 11. Specifically, FIG. 9A shows the optical path of the inner beam L2, and FIG. 9B shows the optical path of the outer beam L1. The optical path of each beam is bent in the auxiliary scanning direction by the cylindrical lens 11, and reflected by a reflection surface 21 of the polygonal mirror 20 and is incident on the first lens 41. The beam reflected by the photoconductive drum side surface of the first lens 41 is, as shown by broken line in figures, not incident on a surface 22, which is next to the surface 21, of the polygonal mirror 20. Therefore, the beam reflected by the photoconductive drum side surface of the first lens 41 will not be reflected and reach the photoconductive drum as the ghosting light. It should be noted that, in the first example, the height, in the auxiliary scanning direction, of the polygonal mirror is 3.0 mm (±1.5 mm), and on a plane including the reflection surface 22 of the polygonal mirror, the inner beam shifts upward in the auxiliary scanning direction by 3.115 mm, while the outer beam shifts by 11.405 mm.

SECOND EXAMPLE

Figure 10:
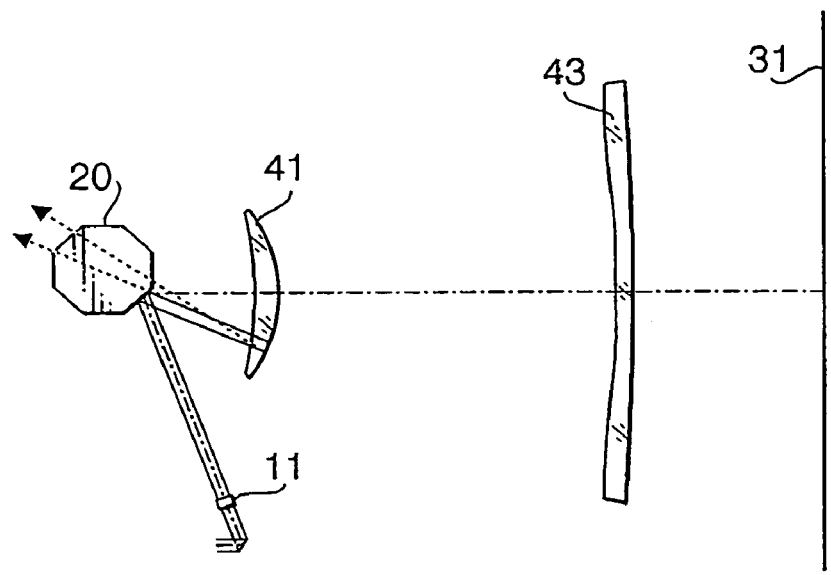
FIG. 10 shows an arrangement of optical elements of the scanning optical system on a main scanning plane according to a second embodiment.

FIG. 10 shows a configuration of the scanning optical system according to a second example. In FIG. 10, the mirrors of the scanning optical system are omitted and the optical paths are developed. Further, the configuration only for the beam L1 is shown for the brevity, and thus, only the second lens 43 and the photoconductive drum 31 are shown in FIG. 10. It should be appreciated that for the other beams L2-L4, the configurations are substantially the same as that shown in FIG. 10. Arrows indicated by broken lines in FIG. 10 represent beams reflected by the photoconductive drum side surface of the first lens 41. As will be described in detail, the beams indicated by broken lines proceed at different levels in the auxiliary scanning direction with respect to the polygonal mirror 20. Therefore, these beams does not serve as ghosting light.

Table 5 indicates a numerical structure on the photoconductive drum side with respect to the cylindrical lens 11 of the scanning optical system according to the second example.

TABLE 5 focal length: 220 mm
scanning width: 216 mm
design wavelength: 780 nm (765 nm-795 nm)
polygon incident angle
main scanning direction: −70.0°
auxiliary scanning direction: outer beam 3.4°, inner beam 1.1°

| surface | Ry | Rz | D | N(780 nm) | DEC-Z | TILT-β |
|---|---|---|---|---|---|---|
| #1 | ∞ | −51.080 | 4.000 | 1.51072 | 0.000 | 0.000 |
| #2 | ∞ | | 97.000 | 1.00000 | 0.000 | 0.000 |
| #3 | ∞ | | 45.000 | 1.00000 | 0.000 | 0.000 |
| #4 | −175.243 | 73.904 | 9.000 | 1.48617 | 0.000 | 0.000 |
| #5 | −65.585 | 60.000 | 135.000 | 1.00000 | 0.000 | 0.000 |
| #6 | −424.322 | | 6.000 | 1.48617 | 9.500/2.926 | 2.5000/0.842 |
| #7 | −1800.000 | | 75.210 | 1.00000 | 0.000 | 0.000 |
| #8 | ∞ | | 0.000 | 1.00000 | 5.049/1.922 | 0.000 |

*values of DEC-Z and TILT-β are those for outer/inner beams

In Table 5, surface numbers 1 and 2 represent the cylindrical lens 11, surface number 3 represents a reflection surface of the polygonal mirror 20, surface numbers 4 and 5 represent the first lens 41, surface numbers 6 and 7 represent the second lens 43, surface number 8 represents the photoconductive drum 31.

The first surface is a cylindrical surface, the second and third surfaces are planar surfaces, the fourth surface is the anamorphic aspherical surface, the fifth surface is the toric surface on which the diffractive lens structure is formed, the sixth surface is the two-dimensional polynomial aspherical surface and the seventh surface is the spherical surface. The power of the polygonal mirror side surface of the first lens 41 in the auxiliary scanning direction is −1.202 dptr.

Values of the coefficients defining the fourth surface are indicated in Table 6.

TABLE 6

Fourth surface (anamorphic aspherical surface)

| K | | 0.000E+00 | | |
|---|---|---|---|---|
| $AM_1$ | 0.000E+00 | | $AS_1$ | −1.1447E−05 |
| $AM_2$ | 0.000E+00 | | $AS_2$ | −1.0235E−05 |
| $AM_3$ | 0.000E+00 | | $AS_3$ | 4.0051E−08 |
| $AM_4$ | −2.1776E−07 | | $AS_4$ | −6.2177E−09 |
| $AM_5$ | 0.000E+00 | | $AS_5$ | −1.3786E−10 |
| $AM_6$ | 1.2667E−11 | | $AS_6$ | 1.5543E−11 |
| $AM_7$ | 0.0000E+00 | | $AS_7$ | 1.1775E−13 |
| $AM_8$ | 2.5506E−14 | | $AS_8$ | −8.8317E−15 |

Table 7 shows the optical path length difference coefficients defining the diffractive lens structure formed on the fifth surface.

TABLE 7

Fifth surface (diffractive lens)

| $P_2$ | −6.4847E−02 |
|---|---|
| $P_4$ | −2.6556E−05 |
| $P_6$ | 0.0000E+00 |
| $P_8$ | 0.0000E+00 |
| $P_{10}$ | 0.0000E+00 |

Table 8 indicates values of coefficients defining the sixth surface.

TABLE 8

Sixth surface (two-dimensional polynomial aspherical surface)

| | $B_{Z0}$ | $B_{Z1}$ | $B_{Z2}$ | $B_{Z3}$ | $B_{Z4}$ |
|---|---|---|---|---|---|
| $B_{Y0}$ | — | −1.3322E−02 | 1.9617E−02 | −7.4154E−06 | −2.3463E−06 |
| $B_{Y1}$ | 0.0000E+00 | 0.0000E+00 | 0.0000E+00 | 0.0000E+00 | 0.0000E+00 |
| $B_{Y2}$ | 0.0000E+00 | 3.1566E−07 | −3.6261E−07 | 7.9282E−09 | −3.8677E−10 |
| $B_{Y3}$ | 0.0000E+00 | 0.0000E+00 | 0.0000E+00 | 0.0000E+00 | 0.0000E+00 |
| $B_{Y4}$ | 8.8036E−08 | −7.2312E−11 | 1.5279E−11 | 1.0168E−12 | −5.6276E−14 |
| $B_{Y5}$ | 0.0000E+00 | 0.0000E+00 | 0.0000E+00 | 0.0000E+00 | 0.0000E+00 |
| $B_{Y6}$ | −1.6444E−12 | 2.6944E−14 | −8.8860E−15 | −1.1729E−16 | 0.0000E+00 |
| $B_{Y7}$ | 0.0000E+00 | 0.0000E+00 | 0.0000E+00 | 0.0000E+00 | 0.0000E+00 |
| $B_{Y8}$ | −1.5772E−17 | −2.6624E−18 | 9.8181E−19 | 0.0000E+00 | 0.0000E+00 |

Figure 11A:
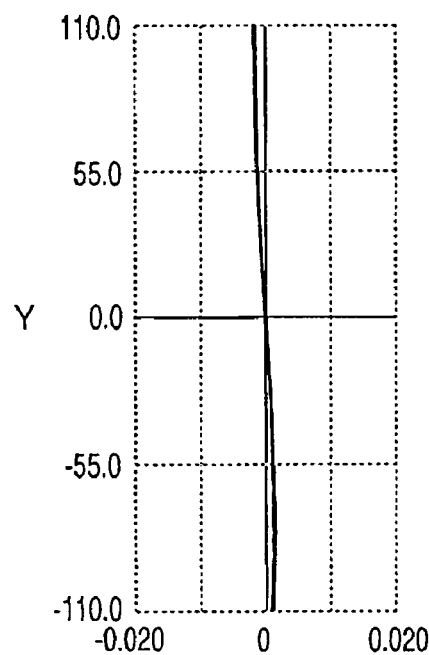
FIG. 11A shows longitudinal chromatic aberration according to the second embodiment when a wavelength of a laser beam is 15 nm lower than the reference wavelength of 780 nm.
Figure 11B:
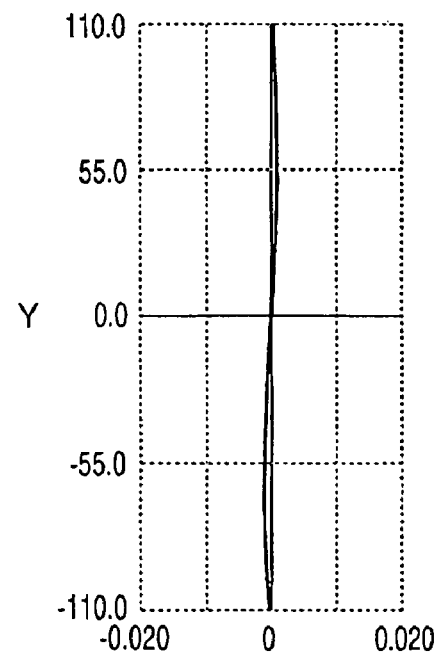
FIG. 11B shows longitudinal chromatic aberration according to the second embodiment when the wavelength of the laser beam is 15 nm is higher than the reference wavelength of 780 nm.

FIGS. 11A and 11B show longitudinal chromatic aberration of the scanning optical system according to the second example. Specifically, FIG. 8A shows a characteristic when the wavelength of the laser beam is 15 nm lower than the design wavelength of 780 nm. FIG. 8B shows the characteristic when the wavelength is 15 nm higher than the design wavelength of 780 nm. In both graphs, the vertical axis represents a scanning position (unit: mm) in the main scanning direction, and the horizontal axis represents the amount of aberration (unit: mm). It is understood from both graphs, regardless whether the wavelength is shifted upward or downward, the longitudinal chromatic aberration can be well suppressed according to the configuration of the second example.

Figure 12A:
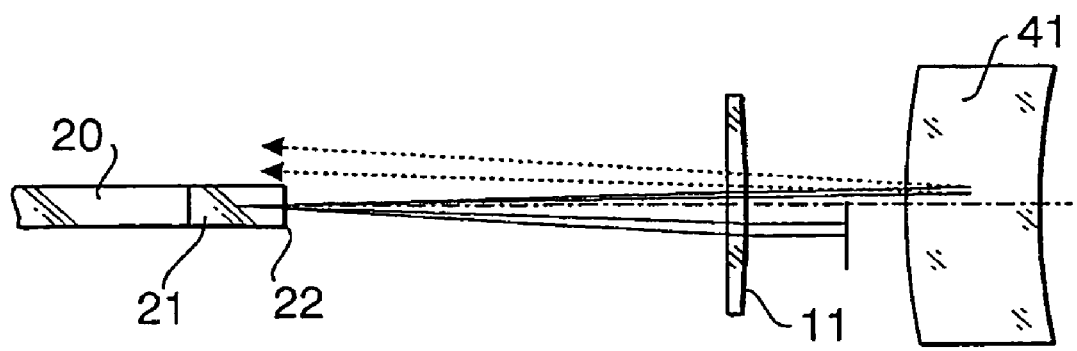
FIGS. 12A and 12B show optical paths of the laser beams reflected by the first lens of the scanning optical system according to the second embodiment.
Figure 12B:
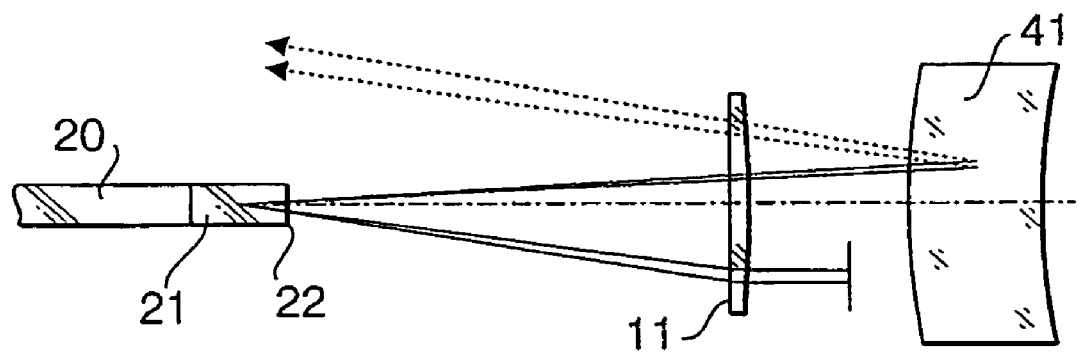

FIGS. 12A and 12B show enlarged cross sectional views, viewed along the main scanning direction, of a part of the polygonal mirror 20, the cylindrical lens 11 and the first lens 11. Specifically, FIG. 12A shows the optical path of the inner beam L2, and FIG. 12B shows the optical path of the outer beam L1. The optical path of each beam is bent in the auxiliary scanning direction by the cylindrical lens 11, and reflected by a reflection surface 21 of the polygonal mirror 20 and is incident on the first lens 41. The beam reflected by the photoconductive drum side surface of the first lens 41 is, as shown by broken line in figures, not incident on a surface 22, which is next to the surface 21, of the polygonal mirror 20. Therefore, the beam reflected by the photoconductive drum side surface of the first lens 41 will not be reflected and reach the photoconductive drum as the ghosting light. It should be noted that, in the second example, the height, in the auxiliary scanning direction, of the polygonal mirror is 3.0 mm (±1.5 mm), and on a plane including the reflection surface 22 of the polygonal mirror, the inner beam shifts upward in the auxiliary scanning direction by 2.693 mm, while the outer beam shifts by 10.101 mm.

THIRD EXAMPLE

Figure 13:
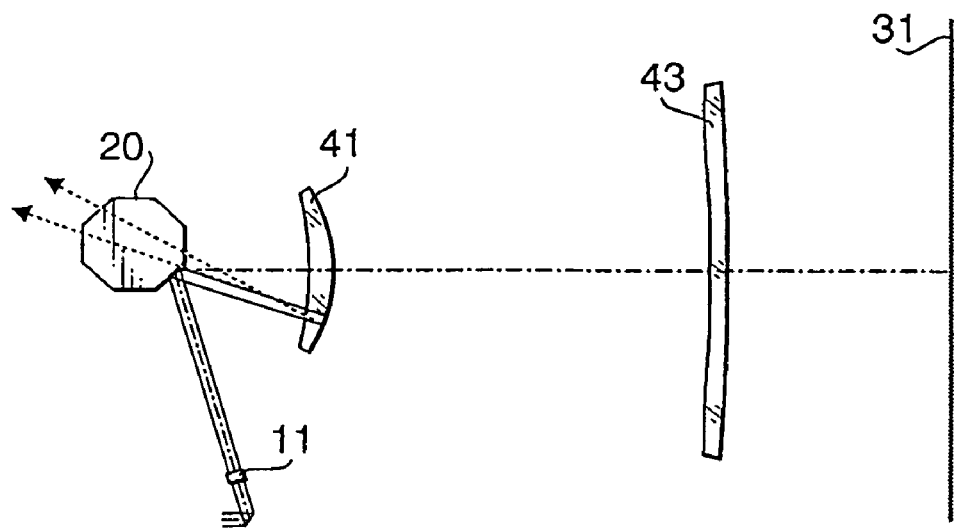
FIG. 13 shows an arrangement of optical elements of the scanning optical system on a main scanning plane according to a third embodiment.

FIG. 13 shows a configuration of the scanning optical system according to a third example. In FIG. 13, the mirrors of the scanning optical system are omitted and the optical paths are developed. Further, the configuration only for the beam L1 is shown for the brevity, and thus, only the second lens 43 and the photoconductive drum 31 are shown in FIG. 13. It should be appreciated that for the other beams L2-L4, the configurations are substantially the same as that shown in FIG. 13. Arrows indicated by broken lines in FIG. 13 represent beams reflected by the photoconductive drum side surface of the first lens 41. As will be described in detail, the beams indicated by broken lines proceed at different levels in the auxiliary scanning direction with respect to the polygonal mirror 20. Therefore, these beams does not serve as ghosting light.

Table 9 indicates a numerical structure on the photoconductive drum side with respect to the cylindrical lens 11 of the scanning optical system according to the third example.

TABLE 9 focal length: 250 mm
scanning width: 216 mm
design wavelength: 780 nm (765 nm-795 nm)
polygon incident angle
main scanning direction: −75.0°
auxiliary scanning direction: outer beam 4.2°, inner beam 1.4°

| surface | Ry | Rz | D | N(780 nm) | DEC-Z | TILT-β |
| --- | --- | --- | --- | --- | --- | --- |
| #1 | ∞ | −51.080 | 4.000 | 1.51072 | 0.000 | 0.000 |
| #2 | ∞ | | 97.000 | 1.00000 | 0.000 | 0.000 |

TABLE 9-continued focal length: 250 mm
scanning width: 216 mm
design wavelength: 780 nm (765 nm-795 nm)
polygon incident angle
main scanning direction: −75.0°
auxiliary scanning direction: outer beam 4.2°, inner beam 1.4°

| surface | Ry | Rz | D | N(780 nm) | DEC-Z | TILT-β |
| --- | --- | --- | --- | --- | --- | --- |
| #3 | ∞ | | 654.000 | 1.00000 | 0.000 | 0.000 |
| #4 | −187.769 | 93.641 | 10.000 | 1.48617 | 0.000 | 0.000 |
| #5 | −74.468 | 150.000 | 154.000 | 1.00000 | 0.000 | 0.000 |
| #6 | −709.096 | | 6.000 | 1.48617 | 15.000/7.237 | 1.100/−0.001 |
| #7 | −1800.000 | | 89.521 | 1.00000 | 0.000 | 0.000 |
| #8 | ∞ | | 0.000 | 1.00000 | 1.867/−1.575 | 0.000 |

*values of DEC-Z and TILT-β are those for outer/inner beams

In Table 9, surface numbers 1 and 2 represent the cylindrical lens 11, surface number 3 represents a reflection surface of the polygonal mirror 20, surface numbers 4 and 5 represent the first lens 41, surface numbers 6 and 7 represent the second lens 43, surface number 8 represents the photoconductive drum 31.

The first surface is a cylindrical surface, the second and third surfaces are planar surfaces, the fourth surface is the anamorphic aspherical surface, the fifth surface is the toric surface on which the diffractive lens structure is formed, the sixth surface is the two-dimensional polynomial aspherical surface and the seventh surface is the spherical surface. The power of the polygonal mirror side surface of the first lens 41 in the auxiliary scanning direction is 2.064 dptr.

Values of the coefficients defining the fourth surface are indicated in Table 10.

TABLE 10

Fourth surface (anamorphic aspherical surface)

| K | | | 0.000E+00 |
| --- | --- | --- | --- |
| $AM_1$ | 0.000E+00 | $AS_1$ | −9.2537E−06 |
| $AM_2$ | 0.000E+00 | $AS_2$ | −3.0982E−06 |
| $AM_3$ | 0.000E+00 | $AS_3$ | 4.3451E−08 |
| $AM_4$ | 0.000E+00 | $AS_4$ | −8.8013E−10 |
| $AM_5$ | 0.000E+00 | $AS_5$ | −1.6290E−10 |
| $AM_6$ | 0.000E+00 | $AS_6$ | 1.3318E−12 |
| $AM_7$ | 0.000E+00 | $AS_7$ | 1.4797E−14 |
| $AM_8$ | 0.000E+00 | $AS_8$ | −1.4225E−16 |

Table 11 shows the optical path length difference coefficients defining the diffractive lens structure formed on the fifth surface.

TABLE 11

Fifth surface (diffractive lens)

| $P_2$ | −6.8414E−02 |
| --- | --- |
| $P_4$ | −1.3424E−05 |
| $P_6$ | 0.0000E+00 |
| $P_8$ | 0.0000E+00 |
| $P_{10}$ | 0.0000E+00 |

Table 12 indicates values of coefficients defining the sixth surface.

TABLE 12

Sixth surface (two-dimensional polynomial aspherical surface)

|  | $B_{Z0}$ | $B_{Z1}$ | $B_{Z2}$ | $B_{Z3}$ | $B_{Z4}$ |
|---|---|---|---|---|---|
| $B_{Y0}$ | — | 1.0191E−01 | 1.590E−02 | −3.4570E−05 | −2.2180E−06 |
| $B_{Y1}$ | 0.0000E+00 | 0.0000E+00 | 0.0000E+00 | 0.0000E+00 | 0.0000E+00 |
| $B_{Y2}$ | 0.0000E+00 | −9.9873E−07 | −1.8262E−07 | 1.5342E−09 | −3.8106E−10 |
| $B_{Y3}$ | 0.0000E+00 | 0.0000E+00 | 0.0000E+00 | 0.0000E+00 | 0.0000E+00 |
| $B_{Y4}$ | 4.9555E−08 | −2.6200E−11 | 7.9659E−12 | 3.3045E−13 | −5.0041E−14 |
| $B_{Y5}$ | 0.0000E+00 | 0.0000E+00 | 0.0000E+00 | 0.0000E+00 | 0.0000E+00 |
| $B_{Y6}$ | −5.8782E−13 | −1.2958E−14 | −4.3015E−16 | −9.8114E−17 | 0.0000E+00 |
| $B_{Y7}$ | 0.0000E+00 | 0.0000E+00 | 0.0000E+00 | 0.0000E+00 | 0.0000E+00 |
| $B_{Y8}$ | −9.2109E−18 | 1.5579E−18 | 4.0676E−19 | 0.0000E+00 | 0.0000E+00 |

Figure 14A:
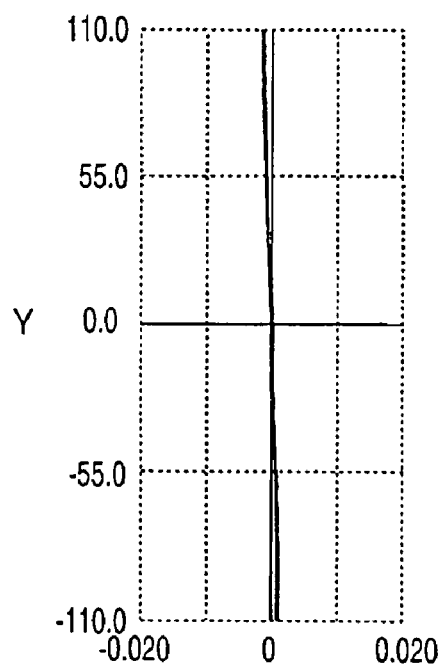
FIG. 14A shows longitudinal chromatic aberration according to the third embodiment when a wavelength of a laser beam is 15 nm lower than the reference wavelength of 780 nm.
Figure 14B:
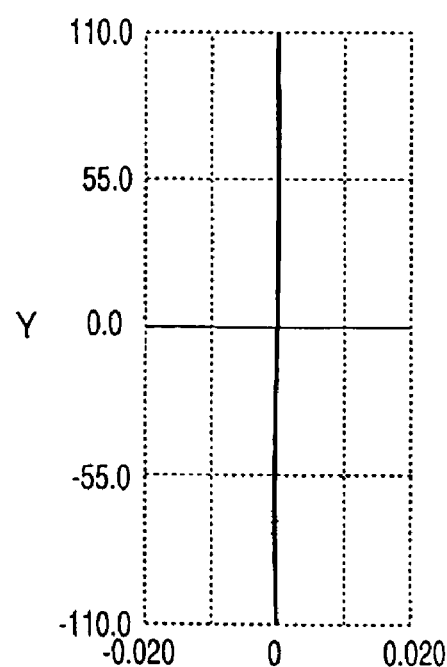
FIG. 14B shows longitudinal chromatic aberration according to the third embodiment when the wavelength of the laser beam is 15 nm is higher than the reference wavelength of 780 nm.

FIGS. 14A and 14B show longitudinal chromatic aberration of the scanning optical system according to the second example. Specifically, FIG. 14A shows a characteristic when the wavelength of the laser beam is 15 nm lower than the design wavelength of 780 nm. FIG. 14B shows the characteristic when the wavelength is 15 nm higher than the design wavelength of 780 nm. In both graphs, the vertical axis represents a scanning position (unit: mm) in the main scanning direction, and the horizontal axis represents the amount of aberration (unit: mm). It is understood from both graphs, regardless whether the wavelength is shifted upward or downward, the longitudinal chromatic aberration can be well suppressed according to the configuration of the second example.

Figure 15A:
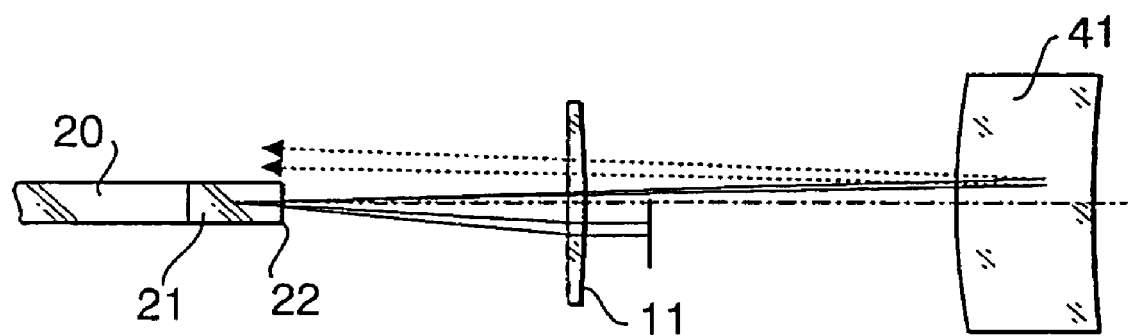
FIGS. 15A and 15B show optical paths of the laser beams reflected by the first lens of the scanning optical system according to the third embodiment.
Figure 15B:
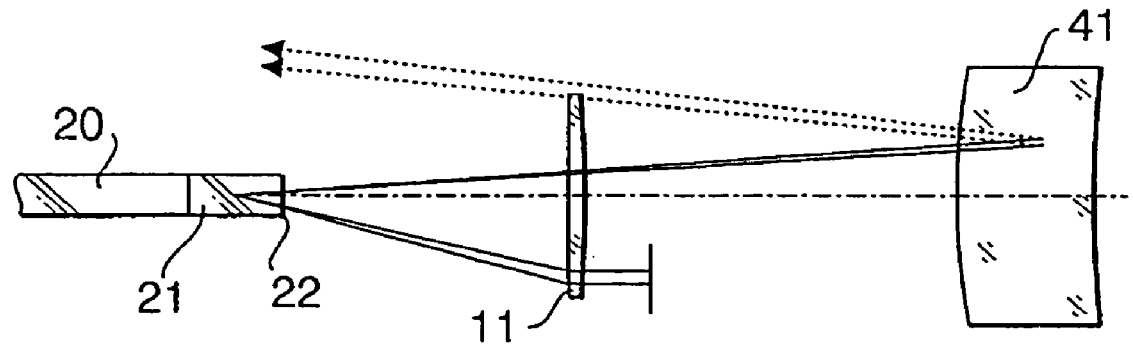

FIGS. 15A and 15B show enlarged cross sectional views, viewed along the main scanning direction, of a part of the polygonal mirror 20, the cylindrical lens 11 and the first lens 11. Specifically, FIG. 15A shows the optical path of the inner beam L2, and FIG. 15B shows the optical path of the outer beam L1. The optical path of each beam is bent in the auxiliary scanning direction by the cylindrical lens 11, and reflected by a reflection surface 21 of the polygonal mirror 20 and is incident on the first lens 41. The beam reflected by the photoconductive drum side surface of the first lens 41 is, as shown by broken line in figures, not incident on a surface 22, which is next to the surface 21, of the polygonal mirror 20. Therefore, the beam reflected by the photoconductive drum side surface of the first lens 41 will not be reflected and reach the photoconductive drum as the ghosting light. It should be noted that, in the third example, the height, in the auxiliary scanning direction, of the polygonal mirror is 3.0 mm (±1.5 mm), and on a plane including the reflection surface 22 of the polygonal mirror, the inner beam shifts upward in the auxiliary scanning direction by 2.904 mm, while the outer beam shifts by 10.348 mm.

COMPARATIVE EXAMPLE

Figure 16:
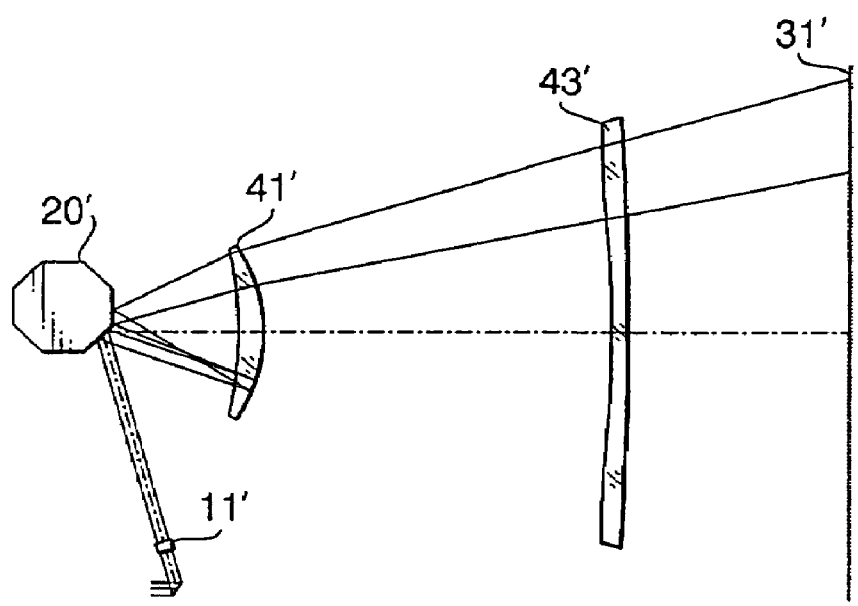
FIG. 16 shows an arrangement of optical elements of the scanning optical system on a main scanning plane according to a comparative example.

FIG. 16 shows a configuration of the scanning optical system according to a comparative example, which is similar to the first through third examples except that the diffractive lens structure is not formed and a polygonal mirror 20' side surface of a first lens 41' is a spherical surface. In FIG. 16, the mirrors of the scanning optical system are omitted and the optical paths are developed. Further, the configuration only for the beam L1 is shown for the brevity, and thus, only the second lens 43' and the photoconductive drum 31' are shown in FIG. 16. It should be appreciated that for the other beams L2-L4, the configurations are substantially the same as that shown in FIG. 16.

Table 13 indicates a numerical structure on the photoconductive drum side with respect to the cylindrical lens 11' of the scanning optical system according to the comparative example.

TABLE 13 focal length: 235 mm
scanning width: 216 mm
design wavelength: 780 nm (765 nm-795 nm)
polygon incident angle
main scanning direction: −75.0°
auxiliary scanning direction: outer beam 3.6°, inner beam 1.2°

| surface | Ry | Rz | D | N(780 nm) | DEC-Z | TILT-β |
|---|---|---|---|---|---|---|
| #1 | ∞ | −51.080 | 4.000 | 1.51072 | 0.000 | 0.000 |
| #2 | ∞ |  | 97.000 | 1.00000 | 0.000 | 0.000 |
| #3 | ∞ |  | 54.000 | 1.00000 | 0.000 | 0.000 |
| #4 | −208.150 |  | 10.000 | 1.48617 | 0.000 | 0.000 |
| #5 | −72.157 | −100.000 | 140.000 | 1.00000 | 0.000 | 0.000 |
| #6 | −529.854 |  | 6.000 | 1.48617 | 12.000/5.747 | 0.900/−0.951 |
| #7 | −1800.000 |  | 86.460 | 1.00000 | 0.000 | 0.000 |
| #8 | ∞ |  | 0.000 | 1.00000 | 1.441/−1.251 | 0.000 |

*values of DEC-Z and TILT-β are those for outer/inner beams

In Table 13, surface numbers 1 and 2 represent the cylindrical lens 11', surface number 3 represents a reflection surface of the polygonal mirror 20', surface numbers 4 and 5 represent the first lens 41', surface numbers 6 and 7 represent the second lens 43', surface number 8 represents the photoconductive drum 31'.

The first surface is a cylindrical surface, the second and third surfaces are planar surfaces, the fourth surface is the spherical surface, the fifth surface is the anamorphic spherical surface, the sixth surface is the two-dimensional polynomial aspherical surface and the seventh surface is the spherical surface. The power of the polygonal mirror side surface of the first lens 41 in the auxiliary scanning direction is 2.602 dptr.

Values of the coefficients defining the fourth surface are indicated in Table 14.

TABLE 14

Fourth surface (anamorphic aspherical surface)

| K | | | 0.000E+00 |
|---|---|---|---|
| $AM_1$ | 0.000E+00 | $AS_1$ | −9.2537E−06 |
| $AM_2$ | 0.000E+00 | $AS_2$ | −3.0982E−06 |
| $AM_3$ | 0.000E+00 | $AS_3$ | 4.3451E−08 |
| $AM_4$ | 0.000E+00 | $AS_4$ | −8.8013E−10 |
| $AM_5$ | 0.000E+00 | $AS_5$ | −1.6290E−10 |
| $AM_6$ | 0.000E+00 | $AS_6$ | 1.3318E−12 |
| $AM_7$ | 0.000E+00 | $AS_7$ | 1.4797E−14 |
| $AM_8$ | 0.000E+00 | $AS_8$ | −1.4225E−16 |

Table 15 indicates values of coefficients defining the sixth surface.

TABLE 15

Sixth surface (two-dimensional polynomial aspherical surface)

| | $B_{Z0}$ | $B_{Z1}$ | $B_{Z2}$ | $B_{Z3}$ | $B_{Z4}$ |
|---|---|---|---|---|---|
| $B_{Y0}$ | — | 8.2549E−02 | 1.6657E−02 | −3.7001E−05 | −2.2454E−06 |
| $B_{Y1}$ | 0.0000E+00 | 0.0000E+00 | 0.0000E+00 | 0.0000E+00 | 0.0000E+00 |
| $B_{Y2}$ | 0.0000E+00 | −2.5643E−07 | −2.2924E−07 | 5.1230E−09 | −3.8131E−10 |
| $B_{Y3}$ | 0.0000E+00 | 0.0000E+00 | 0.0000E+00 | 0.0000E+00 | 0.0000E+00 |
| $B_{Y4}$ | 7.0260E+08 | −6.5474E−11 | 1.4480E−11 | 3.5753E−13 | −5.1316E−14 |
| $B_{Y5}$ | 0.0000E+00 | 0.0000E+00 | 0.0000E+00 | 0.0000E+00 | 0.0000E+00 |
| $B_{Y6}$ | −1.5942E−12 | −1.1334E−15 | −4.8100E−15 | −1.6299E−16 | 0.0000E+00 |
| $B_{Y7}$ | 0.0000E+00 | 0.0000E+00 | 0.0000E+00 | 0.0000E+00 | 0.0000E+00 |
| $B_{Y8}$ | 7.1833E−18 | 1.3676E−18 | 4.0631E−19 | 0.0000E+00 | 0.0000E+00 |

Figure 17A:
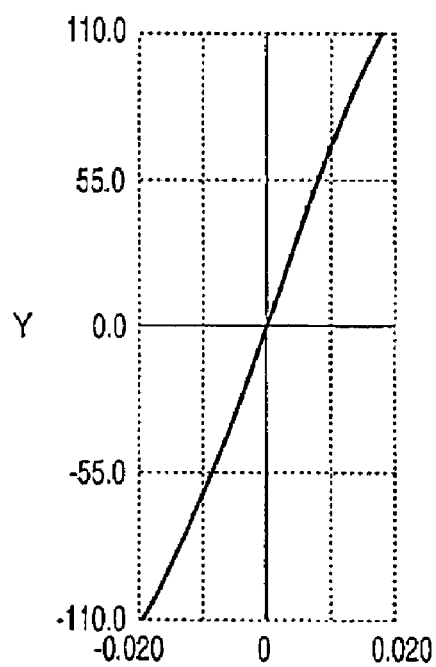
FIG. 17A shows longitudinal chromatic aberration according to the comparative example when a wavelength of a laser beam is 15 nm lower than the reference wavelength of 780 nm.
Figure 17B:
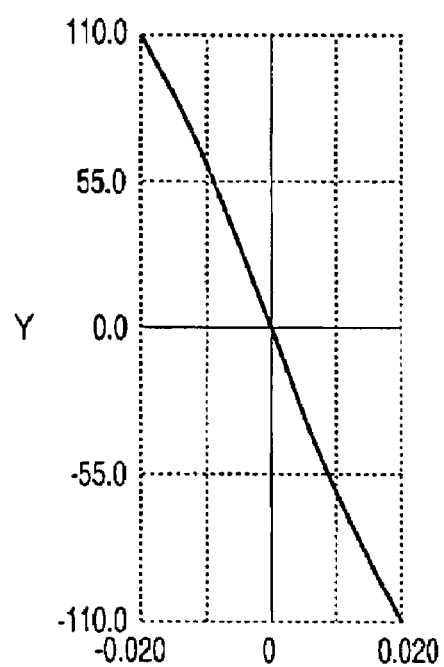
FIG. 17B shows longitudinal chromatic aberration according to the comparative example when the wavelength of the laser beam is 15 nm is higher than the reference wavelength of 780 nm.

FIGS. 17A and 17B show longitudinal chromatic aberration of the scanning optical system according to the comparative example. Specifically, FIG. 17A shows a characteristic when the wavelength of the laser beam is 15 nm lower than the design wavelength of 780 nm. FIG. 17B shows the characteristic when the wavelength is 15 nm higher than the design wavelength of 780 nm. In both graphs, the vertical axis represents a scanning position (unit: mm) in the main scanning direction, and the horizontal axis represents the amount of aberration (unit: mm). It is understood from both graphs, depending whether the wavelength is shifted upward or downward, the longitudinal chromatic aberration having different polarities are presented according to the configuration of the comparative example.

Figure 18A:
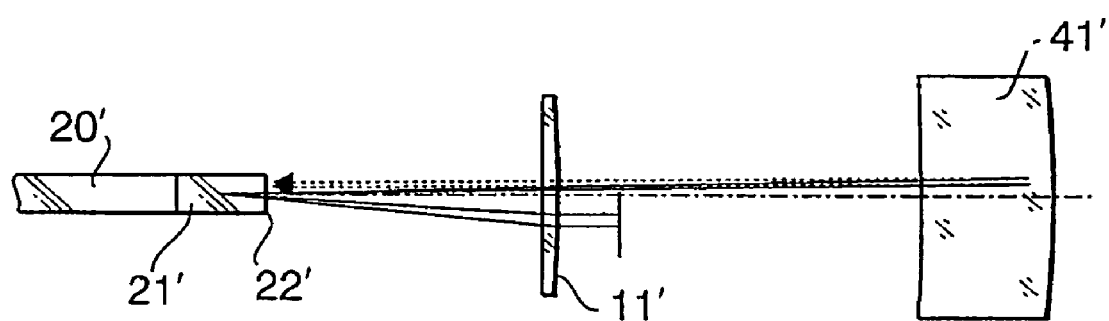
FIGS. 18A and 18B show optical paths of the laser beams reflected by the first lens of the scanning optical system according to the comparative example.
Figure 18B:
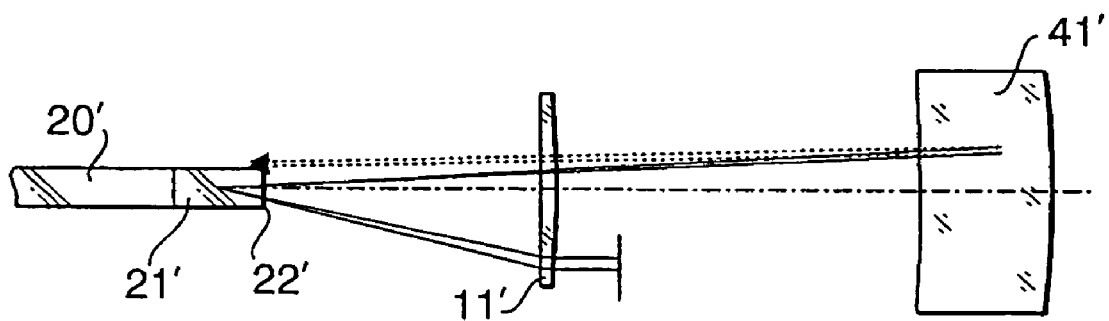

FIGS. 18A and 18B show enlarged cross sectional views, viewed along the main scanning direction, of a part of the polygonal mirror 20', the cylindrical lens 11' and the first lens 41'. Specifically, FIG. 18A shows the optical path of the inner beam L2, and FIG. 18B shows the optical path of the outer beam L1. The optical path of each beam is bent in the auxiliary scanning direction by the cylindrical lens 11', and reflected by a reflection surface 21' of the polygonal mirror 20' and is incident on the first lens 41'. The beam reflected by the photoconductive drum side surface of the first lens 41' is, as shown by broken line in figures, incident on a surface 22', which is next to the surface 21', of the polygonal mirror 20'. Then, the beam is reflected by the surface 22', incident on the imaging optical system and reaches the photoconductive drum 31' and serves as ghosting light. It should be noted that, in the comparative example, the height, in the auxiliary scanning direction, of the polygonal mirror is 3.0 mm (±1.5 mm), and on a plane including the reflection surface 22' of the polygonal mirror 20', the inner beam shifts upward in the auxiliary scanning direction by 0.563 mm, while the outer beam shifts by 2.048 mm.

It is appreciated that, by comparing each of the examples with the comparative example, by forming the diffractive lens structure as described above, the longitudinal chromatic aberration can be compensated. Further, by forming the surfaces of the first lens as surfaces which are not rotationally symmetrical with respect to the optical axis, occurrence of the ghosting light can be suppressed.

The present disclosure relates to the subject matter contained in Japanese Patent Application No. 2004-360286, filed on Dec. 13, 2004, which is expressly incorporated herein by reference in its entirety.

What is claimed is:

1. A scanning optical system, comprising:
    a light source configured to emit a plurality of beams;
    a deflecting device configured to deflect the plurality of beams simultaneously to scan in a main scanning direction; and
    an imaging optical system configured to converge the plurality of beams on a plurality of target surfaces to form a plurality of beam spots scanning on the plurality of target surfaces, respectively,
    wherein the imaging optical system includes:
    a first lens comprising a single lens element arranged on a common optical path along which the plurality of beams deflected by the deflecting device proceed; and
    a diffractive lens structure formed on a target surface side surface of the first lens,
    wherein a base curve of the lens surface on which the diffractive lens structure is formed has a rotational symmetry axis extending in the main scanning direction, the curvature of the lens surface taken along the main scanning direction and the curvature taken along an auxiliary scanning direction are different from each other; and
    wherein the base curve on which the diffractive lens structure is formed is a toric surface, of which a shape along the auxiliary scanning direction is convex on a deflection device side.

2. The scanning optical system according to claim 1, wherein the diffractive lens structure is configured to compensate for longitudinal chromatic aberration of the scanning optical system due to difference of wavelengths of the plurality of beams.

3. The scanning optical system according to claim 1, wherein the base curve on which the diffractive lens structure is formed is a toric aspherical surface of which a shape along the main scanning direction is a non-arc shape.

4. The scanning optical system according to claim 1, wherein a deflection device side lens surface of the first lens is an aspherical surface of which a shape in the main scanning direction is defined as a function of a distance in the main scanning direction from the optical axis of the first lens, and a curvature in the auxiliary scanning direction is defined as another function of a distance in the main scanning direction from the optical axis.

5. The scanning optical system according to claim 1, wherein the imaging optical system includes a plurality of second lenses respectively arranged on a plurality of optical paths of the plurality of beams, each of the plurality of second lenses comprising a single lens element.

6. The scanning optical system according to claim 1, wherein the first lens is arranged at a position closer to the deflecting device than any other optical elements included in the imaging optical system.

7. The scanning optical system according to claim 1, wherein the deflecting device is a polygonal mirror.

8. A tandem type imaging apparatus, comprising:
a light source configured to emit a plurality of beams;
a deflecting device configured to deflect the plurality of beams simultaneously to scan in a main scanning direction; and
an imaging optical system configured to converge the plurality of beams on a plurality of target surfaces to form a plurality of beam spots scanning on the plurality of target surfaces, respectively,
wherein the imaging optical system includes:
a first lens comprising a single lens element arranged on a common optical path along which the plurality of beams deflected by the deflecting device proceed; and
a diffractive lens structure formed on a target surface side surface of the first lens,
wherein a base curve of the lens surface on which the diffractive lens structure is formed has a rotational symmetry axis extending in the main scanning direction, the curvature of the lens surface taken along the main scanning direction and the curvature taken along an auxiliary scanning direction are different from each other; and
wherein the base curve on which the diffractive lens structure is formed is a toric surface, of which a shape along the auxiliary scanning direction is convex on a deflection device side.

9. A lens to be used as a first lens of an imaging optical system of a scanning optical system for an imaging apparatus, the scanning optical system includes a light source configured to emit a plurality of beams, a deflecting device configured to deflect the plurality of beams simultaneously to scan in a main scanning direction, and the imaging optical system configured to converge the plurality of beams on a plurality of target surfaces to form a plurality of beam spots scanning on the plurality of target surfaces, respectively,
wherein the imaging optical system includes:
a first lens comprising a single lens element arranged on a common optical path along which the plurality of beams deflected by the deflecting device proceed; and
a diffractive lens structure formed on a target surface side surface of the first lens,
wherein a base curve of the lens surface on which the diffractive lens structure is formed has a rotational symmetry axis extending in the main scanning direction, the curvature of the lens surface taken along the main scanning direction and the curvature taken along an auxiliary scanning direction are different from each other; and
wherein the base curve on which the diffractive lens structure is formed is a toric surface, of which a shape along the auxiliary scanning direction is convex on a deflection device side.

* * * * *